United States Patent [19]

Kneebone

[11] Patent Number: 4,789,037

[45] Date of Patent: Dec. 6, 1988

[54] SELF-PROPELLED VEHICLE

[75] Inventor: Edward W. S. Kneebone, Floreat Park, Australia

[73] Assignee: Remotely Operated Vehicles Limited, West Perth, Australia

[21] Appl. No.: 57,796

[22] Filed: Jun. 3, 1987

[30] Foreign Application Priority Data

Jul. 4, 1986 [AU] Australia ............................ PH06237

[51] Int. Cl.⁴ .............................................. B62D 55/18
[52] U.S. Cl. ..................................... 180/9.1; 180/901; 305/39; 305/46; 114/222
[58] Field of Search ................ 180/901, 9.1, 9.5, 9.54; 114/222; 305/5, 35 R, 54, 55, 39, 46, 60

[56] References Cited

U.S. PATENT DOCUMENTS 3,724,397  4/1973  Sargent ............................... 180/9.54
3,973,711  8/1976  Perego ................................. 180/901

Primary Examiner—John A. Pekar
Attorney, Agent, or Firm—Dorsey & Whitney

[57] ABSTRACT

A self propelled vehicle for traversing a surface of magnetic material having two or more endless tracks incorporating a plurality of permanent magnets spaced along each track to create a magnetic field of a strength to attach the vehicle to the surface being traversed. Each permanent magnet comprising a bar of magnetised ceramic magnetic material extending in a direction transverse of the track clamped between a pair of magnetic metal plates. The metal plates each extending beyond one face of the ceramic bar at opposite edges of that face to provide respective magnetic poles of opposite polarity so in use only these poles contact the surface being traversed and the ceramic bar is spaced from the surface being traversed.

8 Claims, 4 Drawing Sheets

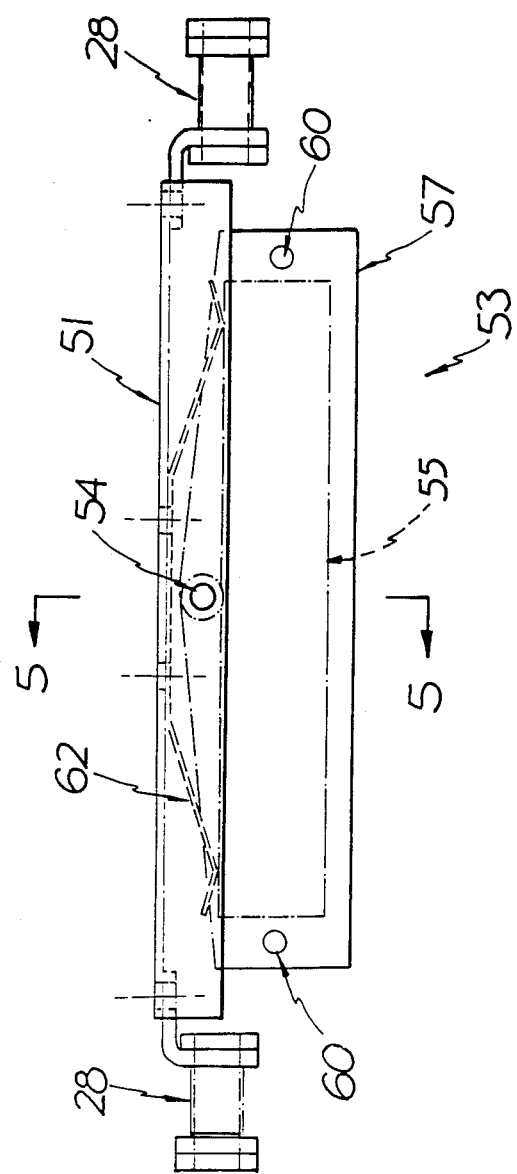

SELF-PROPELLED VEHICLE

This invention relates to a self-propelled vehicle that may be employed to carry out work functions at locations where it is not convenient for a workman to operate. The invention is particularly directed to a vehicle that may travel over a surface of a magnetic material, such as steel surfaces, and carry equipment for the purposes of performing work functions on the surface over which it travels or on an apparatus or components in the vicinity thereof.

There is no particular problem in providing a self propelled vehicle which will travel over horizontal or slightly inclined surfaces, however, there is a need for such a vehicle that can travel along near vertical or steeply inclined surfaces and can even travel across the surface on the underside of a structure, such as the bottom of a ship.

There is disclosed in Australian Pat. No. 416389 by Hitachi Metals Ltd. a self propelled vehicle that is capable of travelling over a surface of magnetic material including vertical surfaces or downwardly facing surfaces. In the preferred form of the vehicle so disclosed, a central electro-magnet is provided to create the principal magnetic field necessary to hold the vehicle to the surface over which it travels. Secondary stationary permanent magnets are provided in the tracks of the vehicle.

Electro-magnets have a number of disadvantages in operating a vehicle of this type, such as the physical size thereof, and the resultant increase in size and weight of the vehicle to house the electro-magnets, which in turn requires an increase in strength and resultant size and weight of the electro-magnet. Also the vehicle must carry sufficient batteries to operate the electro-magnets, or the vehicle must be supplied with electricity by cable from a remote supply. Batteries further increase the size and weight of the vehicle and the required magnetic strength and hence size and weight of the electro-magnets. Power from a remote source restricts the mobility of the vehicle.

The use of a centrally located single electro-magnet as the principal means of attachment of the vehicle to the surface being traversed presents a difficulty in traversing uneven or curved surfaces as the resultant variations in attachment force over the areas of the magnetic field can produce a variation in the total attachment force of an unacceptable level.

There is disclosed in lapsed Japanese Patent Application No. 109372/1975 by Kouichi Matsushima an endless track vehicle having permanent magnet elements that engage the surface being traversed. Each of the magnet elements are wrapped in rubber. It is stated that the rubber is provided to reduce slippage between the tracks and the surface being traversed. It is thus clear that the vehicle does not operate on the basis that the magnet elements provide a megnetic field of sufficient strength to attach the vehicle to the surface being traversed, for with a magnetic field of that strength there could not be slippage between the track and the surface being traversed. Also the rubber around the magnet elements would reduce the effective strength of the magnetic field and further reduce the attraction between the track and the surface being traversed.

It is therefore the principal object of the present invention to provide an improvement in the previously proposed self propelled vehicle of a construction that may be operated on the surface of magnetic materials that is steeply inclined or substantially vertical and has advantages in construction and operation over the earlier proposed constructions.

Accordingly, there is provided by one aspect of the present invention a self propelled vehicle for traversing a surface of magnetic material, comprising a body to which equipment is or may be attached, two or more endless tracks supporting said vehicle body and incorporating a plurality of permanent magnets spaced along each track, so that in use sufficient of said magnets are located relative to the surface being traversed to create a magnetic field of a strength to attach the vehicle to the surface, and means to drive said tracks to propel the vehicle over the surface while the vehicle is held on the surface by the magnets, each permanent magnet comprising a bar of magnetised ceramic magnetic material extending in a direction transverse of the track, said bar being clamped between and secured to a pair of magnetic metal plates in direct intimate contact with the ceramic bar, said metal plates each extending beyond one face of the ceramic bar at opposite edges of said one face to provide respective magnetic poles of opposite polarity whereby in use, only said poles contact the surface being traversed and the ceramic bar is spaced from the surface being traversed.

With the magnets disposed transverse to the direction of advance of the track, only the fore and aft pole piece, formed by the metal plates of each magnet, actually contacts the surface being traversed, while the ceramic bar portion of the magnet located between the pole pieces is spaced a small distance from the surface being traversed. The ceramic bar portion of the magnet is thus protected from the abrasive actions and impact and rubbing loading to which the component of the track that engages the surface being traversed, normally encounters. Accordingly, the working life of the magnetic track is substantially extended as the ceramic bar magnets, which are of relatively low physical strength, are protected.

The fore and aft pole pieces also assist the releasing of the magnets from the surface being traversed at the extent of their travel along the surface as the magnets are released in a peeling action. In other words, as the track at the end of its path is required to be separated from the magnetic surface, the force required to effect said separation is reduced as one pole piece is separated first by a limited pivotal movement of the magnet about the other pole piece. This pivotal or peeling type action substantially reduces the force required to separate the magnets from the magnetic surface.

Normally the vehicle will be provided with two endless tracks, one on either side of the vehicle; each having a plurality of magnets spaced along the length thereof. The configuration of the path of the tracks is arranged so that the length of the flight of the track in contact with the magnetic surface, when in use, will incorporate sufficient magnets to securely attach the vehicle to the surface in all operational attitudes, including the vehicle operating suspended by the tracks. It is preferable to have a large number of magnets of relatively lower strength, than a small number of magnets of high strength. The high number of lower strength magnets has the effect that a lower force is required to separate each magnet at the end of its path of travel, and reduces the proportional variation in the total magnetic attractive force as the magnet at one end of the track is separate and the one at the other end is brought into contact with the magnetic surface.

Also a high number of closely spaced magnets reduces the effect on the total magnet force as a one of the magnets traverses an irregularity or obstruction on the magnetic surface that increases the air gap between that magnet and the magnetic surface.

In accordance with another improvement in the construction and operation of the self-propelled vehicle above described, there is provided a fluid thrust generator mounted on the vehicle body to create in use a force on the vehicle to supplement the magnetic force in attaching the vehicle to the surface of the magnetic material.

The fluid thrust generator is preferably arranged to discharge a stream or streams, of the fluid of the environment in which the vehicle is operating, in a direction so that the reaction force generated by the stream or streams is in a direction to supplement the magnetic force.

The vehicle will normally be operating in air or water, and so that thrust generator may be a fan or other form of pump that will produce the required thrust. In such an arrangement the air or water may be drawn from an area related to the function or work that the vehicle is performing. In one proposal the vehicle may be fitted with equipment that cleans the surface over which it travels, the fan or pump may draw air or water from a location adjacent the area being cleaned, to remove debris created by the cleaning process. The vehicle may also or alternatively be fitted with a viewing device such as a television camera, and the fan or pump can be arranged to draw material from the viewing field thereof to improve the viewing conditions.

As previously referred to, the vehicle may include two endless track assemblies, spaced transversely with respect to the direction of movement of the vehicle. At least one of the track assemblies is preferably mounted for limited rocking movement relative to the other about an axis transverse to the direction of travel of the vehicle. At least one of the track assemblies is also mounted for limited rocking movement relative to the vehicle body about an axis parallel to the direction of travel of the vehicle.

The above referred to pivotal movements of the track assemblies enable the vehicle to traverse irregularities in the surface of magnetic material without loss of traction or the holding effect of the magnetic fields.

In order to prevent reduction in the effective strength of the field of the magnets by leakage into adjacent components of the vehicle, there is preferably provided a shield of non-magnetic material between the track and other parts of the vehicle that are of magnetic material. In this regard the part of the vehicle that supports the flight of the track that engages the surface to be traversed are made principally of non-magnetic material such as stainless steel, or nylon.

The presently proposed vehicle is suitable for submerged used, such as traversing the underwater surfaces of ships or static structures, and therefore the vehicle preferably incorporates suitable buoyancy to reduce the magnetic field strength required to effect attachment of the vehicle to the surface of magnetic material.

In the two endless track assemblies form of the vehicle, each track is driven by a separate electric or hydraulic motor, preferably reversible, through suitable drive trains. Each motor is individually controlled from a remote location via cables or radio. A television camera may be mounted on the vehicle to provide visual information as to the movement of the vehicle and possible obstacles in the path thereof.

The construction of the self-propelled vehicle will be more readily understood from the following description of one embodiment thereof as illustrated in the accompanying drawings.

In the drawings:

FIG. 4 is a sectional view along line 4—4 in FIG. 3;

Figure 1:
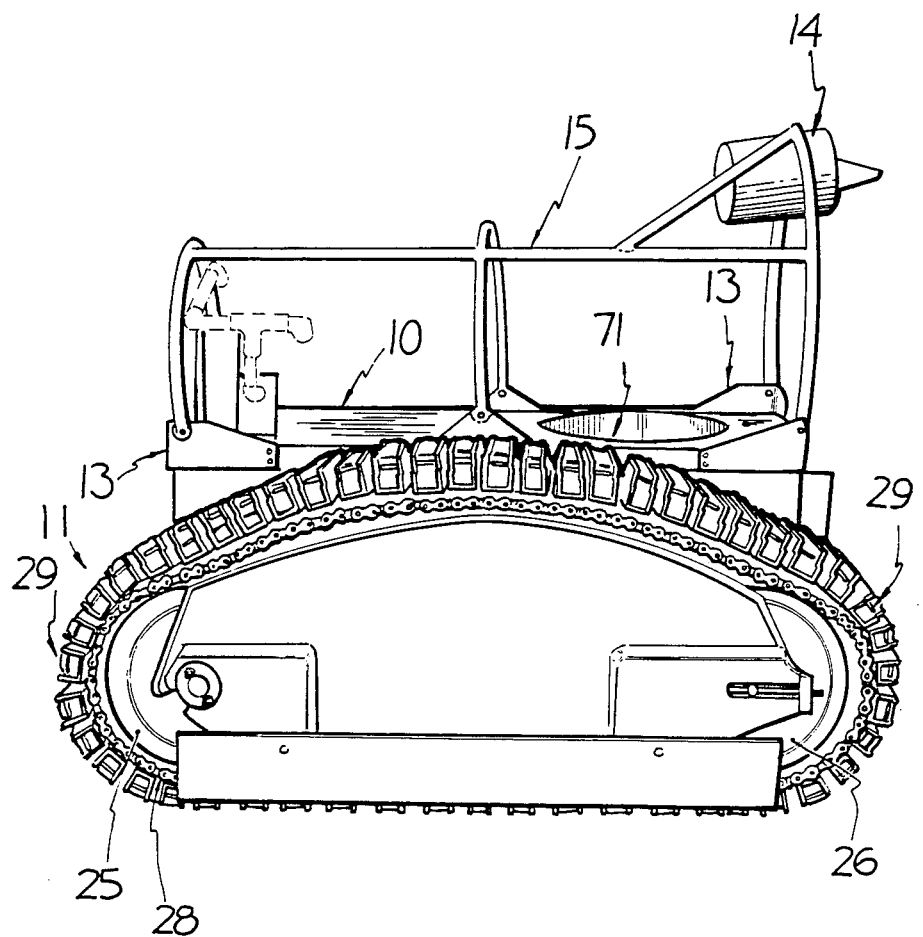
FIG. 1 is a perspective view of the self-propelled vehicle particularly for underwater use.
Figure 2:
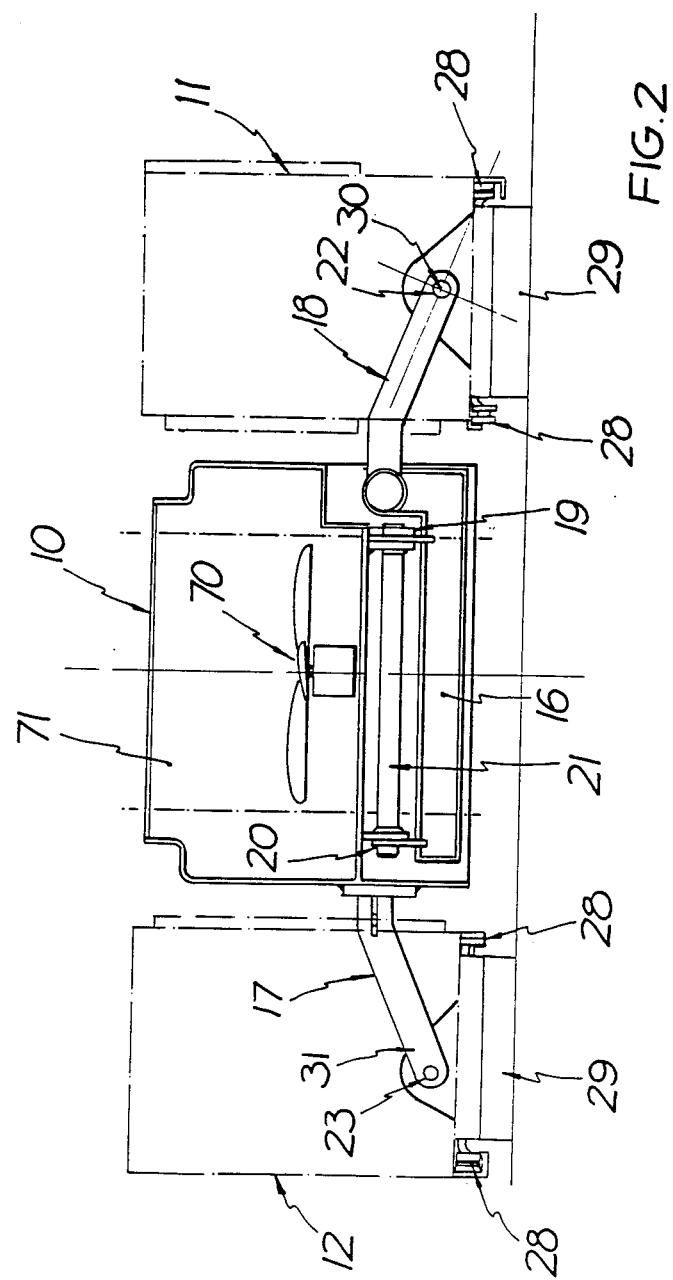
FIG. 2 is a sectional view along line 2—2 in FIG. 1.

Referring now to the drawings, the vehicle comprises a central body 10 supported on a pair of track assemblies 11 and 12 disposed on either side thereof. The body 10 may be adapted to carry any suitable piece of equipment in accordance with the work function to be carried out on the surface over which the vehicle travels. Suitable mounting brackets 13 are provided on the platform for attaching such equipment and in the examples shown, a camera unit 14 is mounted on the frame 15 secured to the mounting brackets 13.

The vehicle as illustrated is particularly designed for use in underwater operation, and the body 10 is sealed to provide a degree of bouyancy and hence reduce the effective weight of the vehicle when submerged. Also additional buoyancy may be provided by adding other sealed compartments to the structure of the vehicle, or if necessary, ballast may be added to the vehicle. The sealed interior of the body is suitable for housing power supplies such as batteries for the equipment to be mounted on the vehicle, or control devices for such equipment.

Each of the track assemblies 11 and 12 is mounted on a respective pair of arms 17 and 18 projecting laterally from the body 10. The two longitudinally spaced arms 17 are formed rigid with the body 10 whilst the similarly spaced two arms 18 extend from a frame 16 pivotally supported by the body 10 at 19 and 20 for relative angular movement about the axis 21 disposed transversely of the intended direction of travel of the vehicle. This arrangement permits the track assembly 11 to rock in the fore and aft direction relative to the body 10, and hence also relative to the other track assembly 12, to accommodate travel of the vehicle over uneven surfaces.

The track assembly 11 is pivotally connected at 30 to the ends of the respective arms 18 to permit pivotal movement of the track assembly 11 relative to the body 10 about the axis 22 extending in the direction of travel of the vehicle. The track assembly 12 is similarly pivotally connected at 31 to the ends of the arms 17 for pivotal movement about the axis 23 parallel to axis 22. This capacity for independent lateral rocking movement of the track assemblies 11 and 12 also assists in maintaining traction when the vehicle is travelling over uneven and curved surfaces.

Mounted in each track assembly 11 and 12 are respective motors (not shown), preferably hydraulic motors, coupled by respective drive means (not shown) to the respective track drive sprocket assembly 25 of each track assembly. As each track assembly is individually driven, appropriate control of the speed and/or direction of the motors of the respective track assemblies can be employed to steer the vehicle.

Each track assembly also includes an adjustable rear chain guide sprocket assembly 26. Each of the drive and guide sprocket assemblies are constructed to carry two laterally spaced endless chains 28, with a plurality of track magnet assemblies 29, secured to and extending between the chains 28. The track magnet assemblies 29 are connected to respective links of the two chains 28 so that the required flexibility is available for the assembly of chains and track magnets to pass around the endless path described by the disposition of the drive and guide sprocket assemblies.

Figure 3:
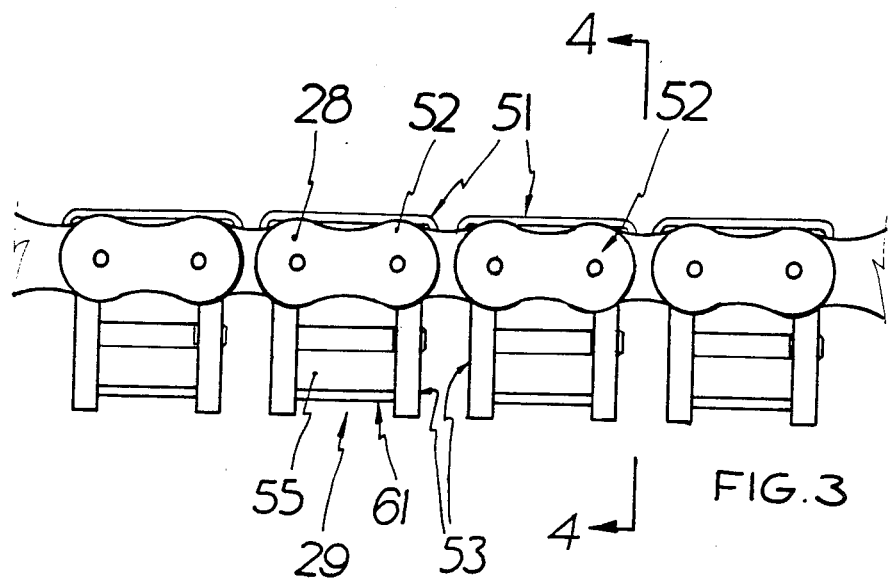
FIG. 3 is an enlarged side elevation of part of the endless track of the vehicle shown in FIG. 1.

Each alternative link of each chain 28 has a magnet assembly 29 attached thereto. As seen in FIG. 3, each magnet assembly comprises a mounting bar 51 which is attached at the ends to respective links 52 of the respective chains 28. The bars 51 are of a downwardly open channel shape and each receives therein a permanent magnet unit 53 pivotally attached by the central pin 54.

Figure 5:
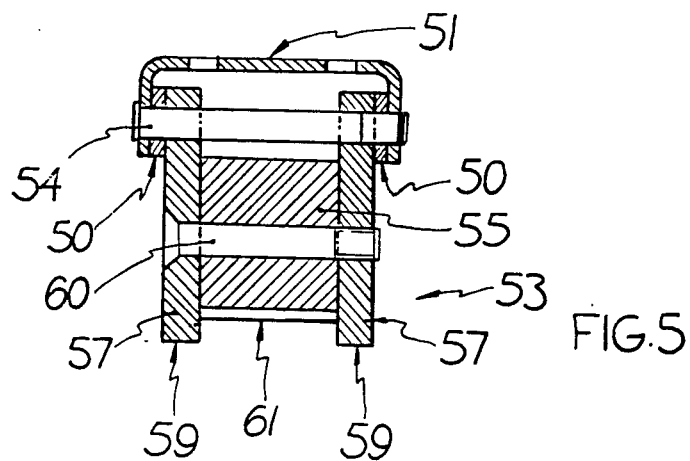
FIG. 5 is a sectional view along line 5—5 in FIG. 4.

The permanent magnets unit 53 comprises a rectangular bar 55 of ceramic magnetised material located between the plates 57 of mild steel. The pole plates 57 extend below the lower face of the bar 55 as seen in FIG. 5 so the lower edges 59 of the plates will contact the surface to be traversed by the vehicle, and there will be a small air gap between the magnetised bar 55 and the surface to be traversed. However, this construction provides what is in effect a horse-shoe type magnet having a strong magnetic field to hold the track assembly to the surface being traversed. The plates 57 are made of mild steel so as to function as pole pieces for the magnetised bar 55, and the pin 52 and the mounting bar 51 are of non-magnetic material, such as stainless steel. The spacers 50 on the pin 54 are of nylon or other non-magnetic material to isolate the plates 57 from the mounting bar 51.

The magnetised bars 55 are preferably made of a magnetic ceramic material based on one of the known high magnetic materials such as neodymium, samarium or barium ferric oxide, which provides a high strength magnetic field compared with normal ferrous metals, such as iron or steel. In order to protect the ceramic magnets, a strip 61 of non-magnetic material, such as stainless steel, is provided between the lower ends of the plates 57. The strip 61 may be adhered to the lower face of the magnetised bar 55.

A strip spring 62 of stainless steel is located between the magnet unit 53 and the base of the mounting bar 51 to normally hold the lower edges 59 of the plates 57 parallel to the mounting bar 51, while permitting limited pivotal movement about the pin 54. A rubber pad or pads may be substituted for the spring 62.

To assist in maintaining the tracks in contact with the surface being traversed, the pump 70 is mounted in the cavity 71 in the body 10, which draws water or air from below the vehicle. The water, or air, is delivered upward from the cavity 71 by the pump so that the reaction force is downward on the vehicle to press the tracks into contact with the surface being traversed. The above reference to "upward" and "downward" relate to the vehicle as viewed in FIG. 1 and may be in any direction depending on the direction of the surface being traversed. That is, the reaction force is always toward the surface being traversed. Also if the vehicle is operating in a media other than water, the pump will function similarly.

The pump is drawn by suitable motor either electric, hydraulic, or penumatic. When operating in water or air the pump may conveniently be of the fan or propellor type, which will produce the required reaction force.

The self-propelled vehicle as described herein is particularly suitable for operating or near vertical surfaces, or on the underside of structures, such as ships, as the magnetic tracks create a magnetic field of sufficient strength to support the vehicle even in an inverted position.

The claims defining the invention are as follows:

I claim:

1. A self-propelled vehicle for traversing a surface of magnetic material, comprising a body to which equipment is or may be attached, two or more endless tracks supporting said vehicle body and incorporating a plurality of permanent magnets spaced along each track, so that in use sufficient of said magnets are located relative to the surface being traversed to create a magnetic field of a strength to attach the vehicle to the surface, each permanent magnet being mounted for limited pivotal movement relative to the endless track about an axis substantially parallel to the direction of travel of the vehicle, and means to drive said tracks to propel the vehicle over the surface while the vehicle is held on the surface by the magnets, each permanent magnet comprising a bar of magnetised ceramic magnetic material extending in a direction transverse of the track, said bar being clamped between and secured to a pair of magnetic metal plates in direct intimate contact with the ceramic bar, said metal plates each extending beyond one face of the ceramic bar at opposite edges of said one face to provide respective magnetic poles of opposite polarity whereby in use, only said poles contact the surface being traversed and the ceramic bar is spaced from the surface being traversed.

2. A self-propelled vehicle as claimed in claim 1, wherein at least one endless track assembly is mounted for pivotal movement relative to the body about an axis transverse to the direction of travel of the vehicle.

3. A self-propelled vehicle as claimed in claim 1 or 2, wherein at least one endless track assembly is mounted for pivotal movement relative to the body about an axis parallel to the direction of travel of the vehicle.

4. A self-propelled vehicle as claimed in claim 1, wherein each endless track assembly comprises a pair of drive chains, laterally spaced and supported to travel in unison on respective identical laterally spaced paths, and a plurality of carrier bars spaced along and extending transversely to the chains, each carrier bar being secured to a respective link of each chain, each carrier bar having one of the permanent magnets supported thereby.

5. A self-propelled vehicle as claimed in claim 4, wherein the permanent magnet is pivotally connected to the carrier bar to move relative thereto about an axis substantially parallel to the direction of travel of the vehicle.

6. A self-propelled vehicle as claimed in claim 4 or 5, wherein one endless track assembly is mounted for pivotal movement relative to the body about an axis transverse to the direction of travel of the vehicle.

7. A self-propelled vehicle as claimed in claim 1 or 5, wherein at least one endless track assembly is mounted for pivotal movement relative to the body about an axis parallel to the direction of travel of the vehicle.

8. A self-propelled vehicle as claimed in claim 4 or 5, wherein resilient means are located between each carrier bar and the permanent magnet connected thereto.

* * * * *